United States Patent [19]
Nagorcka

[11] Patent Number: 5,352,029
[45] Date of Patent: Oct. 4, 1994

[54] POSITIVELY DRIVEN ELASTOMERIC TRACKED WORK VEHICLE

[75] Inventor: James A. Nagorcka, Tarrington, Australia

[73] Assignee: Warane Pty. Ltd., Hamilton, Australia

[21] Appl. No.: 854,593

[22] PCT Filed: Nov. 12, 1990

[86] PCT No.: PCT/AU90/00542

§ 371 Date: Jun. 10, 1992

§ 102(e) Date: Jun. 10, 1992

[87] PCT Pub. No.: WO91/07306

PCT Pub. Date: May 30, 1991

[30] Foreign Application Priority Data

Nov. 13, 1989 [AU] Australia ................. PJ7365

[51] Int. Cl.$^5$ ......................................... B62D 55/088
[52] U.S. Cl. ...................................... 305/39; 305/38; 305/56; 305/11
[58] Field of Search .................. 305/35 R, 35 EB, 38, 305/39, 56, 57, 11, 12, 13

[56] References Cited

U.S. PATENT DOCUMENTS

| | | |
|---|---|---|
| Re. 32,442 | 6/1987 | Satzler . |
| 1,539,582 | 5/1925 | Landry . |
| 1,542,149 | 6/1925 | Landry . |
| 1,673,541 | 6/1928 | Wilson . |
| 1,852,197 | 4/1932 | Wilson . |
| 1,968,043 | 7/1934 | Knox et al. ............ 180/9.2 |
| 2,025,999 | 12/1935 | Myers . |
| 2,302,658 | 11/1942 | Artz . |
| 2,461,849 | 2/1949 | Slemmons et al. . |

(List continued on next page.)

FOREIGN PATENT DOCUMENTS

| | | |
|---|---|---|
| 139749 | 9/1947 | Australia . |
| 442657 | 6/1971 | Australia . |
| 469531 | 8/1974 | Australia . |
| 642090 | 5/1978 | Australia . |
| 20400/76 | 6/1978 | Australia . |
| 43875/79 | 4/1980 | Australia . |
| 558804 | 6/1983 | Australia . |
| 35023 | 7/1985 | Australia . |
| 35027 | 7/1985 | Australia . |
| 574704 | 12/1985 | Australia . |
| 49079/85 | 4/1987 | Australia . |
| 577480 | 5/1987 | Australia . |
| 584182 | 6/1987 | Australia . |
| 580139 | 8/1987 | Australia . |
| 74758/87 | 1/1988 | Australia . |
| 76852 | 2/1988 | Australia . |

(List continued on next page.)

Primary Examiner—Russell D. Stormer
Attorney, Agent, or Firm—Jacobson, Price, Holman & Stern

[57] ABSTRACT

A drive assembly for a track laying vehicle including a vehicle body (2), at least one track (9) mounted on and driven by wheels (5) rotatably mounted and driven on the vehicle body. At least one of the wheels is a drive wheel and the continuous elastometric track includes a main body having a ground engaging surface with lugs (10) and an opposite wheel engaging surface having a plurality of power transmission elements (11) integrally molded with the main body and projecting from the wheel engaging surface. The drive wheel includes a hub portion (66, 67), a plurality of circumferentially spaced rim supports (8) connected to the hub member, at least one pair of circumferential rim sections (65) connected to the rim supports (8) in laterally spaced relationship to form a gap (37) therebetween with open side zones between the rim sections and side portions of adjacent rim supports, and a plurality of circumferentially spaced drive members (7) extending between the rim sections and dividing the gap into a plurality of circumferentially spaced radially outer zones adapted to receive power transmission elements therein engagable with the drive members with the radially outer zones communicating with the open side zones. The track includes a plurality of substantially parallel reinforcing longitudinal filaments (55) and spaced laterally extending anchor members (57) and additional reinforcing filaments (58) extending into the power transmission elements (11). The open construction of the drive wheel facilitates self-exuding of debris, such as dirt, rocks, water, etc., which may enter between the track and the drive wheel.

29 Claims, 6 Drawing Sheets

U.S. PATENT DOCUMENTS

| | | | |
|---|---|---|---|
| 2,535,254 | 12/1950 | Attwell . | |
| 2,793,150 | 5/1957 | Deaves . | |
| 2,854,294 | 9/1958 | Bannister | 305/57 X |
| 3,017,942 | 1/1962 | Gamaunt | 180/9.2 |
| 3,072,443 | 1/1963 | Yoe . | |
| 3,451,728 | 6/1969 | Bruneau . | |
| 3,472,563 | 10/1969 | Irgens | 305/57 X |
| 3,510,174 | 5/1970 | Lamb . | |
| 3,582,154 | 6/1971 | Russ, Sr. . | |
| 3,597,017 | 8/1971 | Tamaka et al. . | |
| 3,722,962 | 3/1973 | Cooper . | |
| 3,734,576 | 5/1973 | Heiple et al. . | |
| 3,758,169 | 9/1973 | Trapp . | |
| 3,900,231 | 8/1975 | Ohm . | |
| 4,093,318 | 6/1978 | Edwards . | |
| 4,145,092 | 3/1979 | Kasin | 305/56 X |
| 4,218,932 | 8/1980 | McComber | 305/57 X |
| 4,221,272 | 9/1980 | Kell . | |
| 4,281,882 | 8/1981 | van der Lely . | |
| 4,469,379 | 9/1984 | Kotyuk, Jr. . | |
| 4,519,654 | 5/1985 | Satzler et al. . | |
| 4,537,267 | 8/1985 | Satzler . | |
| 4,569,561 | 2/1986 | Edwards et al. . | |
| 4,616,883 | 10/1986 | Edwards et al. . | |
| 4,681,177 | 7/1987 | Zborowski . | |
| 4,844,560 | 7/1989 | Edwards et al. . | |
| 4,861,120 | 8/1989 | Edwards et al. . | |
| 4,884,852 | 12/1989 | Edwards et al. . | |
| 4,906,054 | 3/1990 | Edwards et al. . | |
| 5,058,963 | 10/1991 | Wiesner et al. | 305/35 EB |
| 5,145,242 | 9/1992 | Togashi | 305/35 EB |

FOREIGN PATENT DOCUMENTS

| | | | |
|---|---|---|---|
| 59636/86 | 10/1988 | Australia . | |
| 16140 | 11/1988 | Australia . | |
| 16437 | 11/1988 | Australia . | |
| 20523 | 11/1988 | Australia . | |
| 23907 | 5/1989 | Australia . | |
| 602265 | 7/1989 | Australia . | |
| 608192 | 7/1989 | Australia . | |
| 602577 | 10/1990 | Australia . | |
| 854807 | 4/1940 | France . | |
| 1117612 | 5/1956 | France . | |
| 2471905 | 12/1979 | France . | |
| 56-167568 | 12/1981 | Japan . | |
| 61-6079 | 1/1986 | Japan . | |
| 2048280 | 2/1990 | Japan | 305/57 |
| WO82/04021 | 11/1982 | PCT Int'l Appl. . | |
| WO85/02824 | 7/1985 | PCT Int'l Appl. . | |
| WO87/02955 | 5/1987 | PCT Int'l Appl. . | |
| 87/03551 | 6/1987 | PCT Int'l Appl. . | |
| WO87/04987 | 8/1987 | PCT Int'l Appl. . | |
| WO87/05888 | 10/1987 | PCT Int'l Appl. . | |
| WO89/05740 | 6/1989 | PCT Int'l Appl. . | |
| WO89/08042 | 9/1989 | PCT Int'l Appl. . | |
| 1245488 | 7/1986 | U.S.S.R. . | |
| 403808 | 1/1934 | United Kingdom . | |
| 2104015 | 3/1983 | United Kingdom . | |
| 2164616 | 3/1986 | United Kingdom . | |

POSITIVELY DRIVEN ELASTOMERIC TRACKED WORK VEHICLE

BACKGROUND OF THE INVENTION

This invention relates generally to a track laying vehicle and to apparatus and devices suitable for use in such a vehicle.

The track laying vehicle may be of the type comprising a main body having a longitudinal axis extending between its forward and rearward ends, a pair of track assemblies each disposed on opposite sides of the main body with each assembly comprising first and second wheels which are spaced apart in the direction of the longitudinal axis with at least one of the wheels defining a drive wheel.

There have been many attempts over the years to combine the advantages of tracks with the mobility and speed of pneumatic tires. A work vehicle using tracks converts more efficiently the engine power to pulling power than tires when worked on soft and/or loose surfaces. There is also less slippage and less compaction when comparing a tracked work vehicle and a rubber tired vehicle with the same weight to power ratio working on the same surface.

For many years, steel tracks have been the accepted form of tracks for a pulling and/or work vehicle, because they utilize a positive and mechanical drive between the drive wheel and the ground engaging track. However, steel tracks are generally limited to much lower maximum speeds because of their weight and wear characteristics. Steel tracks also have a relatively high noise level, higher initial cost and cannot be used on improved road surfaces without causing unacceptable damage. The high cost of repair to the joints of the steel track make them unacceptable for high speed applications. There have been many attempts to successfully use an elastomeric or rubber belt entrained around a driven wheel and an idler wheel to enable a tracked vehicle to work at higher speeds and retain the traction and flotation of steel tracks.

Previous inventions generally fall into two categories, positively driven belts and frictionally driven belts.

Many previous designs of positively driven elastomeric or rubber tracks have used two continuous belts joined laterally by inflexible ground engaging cross bars to provide a "chain and sprocket" type drive and to give lateral stiffness to the rubber track.

Still other positive drive tracks have used rubber belts with multiple rows of segments running longitudinally and protruding inwardly on the belt with opposite segments of each row being joined by an inflexible cross member to provide positive drive, and lateral engagement to the driving wheel and idler.

While many of these positive drive tracks achieve a certain amount of success, they are costly and complicated to manufacture, and have low levels of tolerance to debris ingestion and would tend to "clog up" when used in many farming applications.

Other attempts to use elastomeric or rubber tracks have been made by way of a frictional drive between the drive wheel and the belt by tensioning the idler wheel away from the drive wheel. Many of the friction drive systems have a dual purpose driving/guiding structure in the form of a "V" and running longitudinally on the inside of the belt to provide a guiding and driving means similar to a V-belt drive. The driving and guide grooves of the drive wheels, for this type of frictional drive, tend to accumulate a high level of debris and lose frictional drive through a lack of engagement on the side surfaces.

A more recent patent has been a frictional drive using flat lateral driving surfaces of the drive wheel and belt with a "dual wheel" drive and tensioning idler to accommodate guiding lugs extending inwardly on the belt which limits lateral movement between the wheels and the belt. This system relies heavily on a highly tensioned belt, which is at least eight hundred and fifty Newtons per lateral centimeter of belt, to maintain frictional drive.

There are a number of disadvantages with this type of frictional drive.

Firstly there is a significant level of parasitic power loss caused by the highly tensioned belt.

Breaking force and reverse thrust of the vehicle by means of the drive wheel is limited to, and directly related to the tensioning force of the idler wheel. Any braking force by means of the drive wheel higher than the tensioning force will cause the belt to "free wheel" around the outer surface of the drive wheel, creating a possible dangerous situation for the operator.

Frictional engagement between the drive wheel and the belt can be lost through the ingestion of a lubricating medium such as water, mud, and/or other friction reducing material. Any amount of this material will cause relative movement or slip between the drive wheel and the inner surface of the belt until a sufficient part of the inner belt's surface and the outer drive wheel surface have been cleaned or "wiped" to re-establish frictional contact. A continued ingestion of friction reducing material such as water and/or mud will cause continued slippage between the belt and the drive wheel resulting in lost drive and excessive wear of the contact surfaces.

While this type of frictionally driven work vehicle is commercially available it is generally limited to dry conditions to sustain maximum pull and intermittent ingestion of friction reducing material.

BRIEF SUMMARY OF THE INVENTION

It is an object of the present invention to provide apparatus which is suitable for use in a vehicle of the type referred to which alleviates one or more of the aforementioned disadvantages.

According to one aspect of the present invention there is provided a track assembly for a track laying vehicle including a vehicle body having a longitudinal axis extending between forward and rearward ends of the vehicle, the vehicle comprising two of the track assemblies which are disposed on opposite sides of the vehicle body and each track assembly comprising; at least first and second wheels which, in use, are spaced apart in the direction of the longitudinal axis with at least one of the wheels defining a drive wheel; a continuous elastomeric track or belt having a ground engaging surface, an opposite wheel engaging surface and a plurality of power transmission elements projecting from the wheel engaging surface, the track assembly being characterized by; the drive wheel comprising a hub, a plurality of rim supports operatively connected to the hub, the rim supports being circumferentially spaced apart and radially extending from the hub and having an outer support portion and opposed side portions at least one pair of circumferential side rim sections operatively connected to the outer support portion of the rim supports in spaced apart relation to one another so as to form a gap therebetween, with open side zones between each rim section and the side portions of adjacent rim supports, and a plurality of circumferential spaced apart drive members extending between the rim sections so as to separate the gap into a plurality of circumferentially spaced radially outer zones each being adapted to receive therein one of the power transmission elements on the continuous track or belt, the outer zones communicating with the open side zones.

The power transmission elements in use engage the drive members on the drive wheel to cause rotation thereof. The power transmission elements may also act as guides for locating the elastomeric track or belt on the wheels. For example, the power transmission elements may be arranged so as to inhibit lateral movement of the belt relative to the wheels to try and ensure that the belt does not slip off the wheels.

The hub may comprise a disc-like member and each rim support may include a plate like body which extends generally transversely of the disc-like member with an outer edge defining the outer support portion. The side portions of each rim support plate may be inclined inwardly from the outer edge towards a region which is operatively connected to the hub.

Advantageously the facing edges of the rims are inclined inwardly from the outer face.

In one advantageous form, two rims are provided; however in certain applications it may be desirable to have more than two rims. For example, the power transmission elements may be arranged in two or more generally parallel lines extending in the direction of the longitudinal axis and, as such, more than two rims may be provided so that there are sets of rims with drive members therebetween for each of the lines of power transmission elements.

The drive members may comprise cross members extending between the rims. The cross members may be in the form of rods, tubes or bars.

According to another aspect of the present invention there is provided a continuous track or belt for use in a track assembly as described above, the track or belt comprising a main body of elastomeric material having a ground engaging surface and an opposite wheel engaging surface and a plurality of power transmission elements formed unitarily with the main body and projecting from the wheel engaging surface thereof, each power transmission element including at least one drive side, a plurality of generally parallel reinforcing filaments extending in the longitudinal direction of the main body and a plurality of spaced apart laterally extending mounting members within the main body of the elastomeric track in a region adjacent the power transmission elements, the longitudinal extending reinforcing filaments being arranged to pass through the reinforcing members, additional reinforcing filaments which are operatively connected to the lateral reinforcing members and which extend into the region of each of the power transmission and guiding elements. It will be appreciated that the track or belt according to this aspect of the invention may be used with machines or track assemblies of the type described above.

The track or belt may further include laterally extending reinforcing filaments within the belt. The power transmission elements comprise a series of lugs arranged in at least one line and in spaced apart relation in the direction of the longitudinal axis of the main body, the lugs projecting from the wheel engaging surface and tapering inwardly towards the free end thereof. The lugs may be centrally disposed on the wheel engaging surface although, as mentioned earlier, they can be arranged in two or more lines.

The additional reinforcing elements may each comprise at least one loop of filament having its free ends secured to respective ones of said mounting members with at least one loop extending into a respective lug with which it is associated. The or each loop may be disposed in or adjacent the region of the drive side and in a plane generally parallel thereto. The track or belt may have more than one drive side. For example, where the belt is to be used with a vehicle which can travel in both forward and reverse directions the two opposite forward and rearward facing sides define drive sides. The sides of the or each loop of the reinforcing element may be disposed in forwardly or rearwardly inclined plane.

According to another aspect of the present invention there is provided a suspension assembly for use in a track laying vehicle, the vehicle comprising a vehicle body having a longitudinal axis extending between forward and rearward ends of the vehicle, a pair of track assemblies disposed on opposite sides of the main body, each track assembly comprising first and second wheels, which are spaced apart in the direction of the longitudinal axis with at least one of the wheels defining a drive wheel, and a continuous elastomeric belt entrained around the wheels and driven by the drive wheel, the suspension assembly comprising a pair of axles each being associated with a respective one wheel of each of the pair of track assemblies, each axle being arranged so that the axis of each axle can pivot about a lateral axis which is generally parallel to the axle axis and extends at right angles to the longitudinal axis so that the wheel carried by each axle can move forwardly and rearwardly along a line parallel to the longitudinal axis. It will be appreciated that the suspension system may be applicable to vehicles other than the type described above.

The assembly may further include a sub-frame operatively mounted to the vehicle body for pivotal movement about a first axis which extends generally parallel to the longitudinal axis.

Advantageously the lateral axis passes through the first axis. Furthermore, the lateral axis and first axis are disposed below the axes of said axles. It will be appreciated however, that it could be disposed above.

Means may be provided for urging said axles in a direction which causes the elastomeric belts to be tensioned. One end portion of the sub-frame may be operatively supported by a laterally extending suspension arm adapted for generally vertical movement relative to the vehicle frame one end of said suspension arm being connected to the vehicle frame by variable force spring means, the other end being pivotally connected to the vehicle frame. There may further be provided a plurality of load sharing wheels adapted to run on the wheel engaging surface of the elastomeric track or belt, the load sharing wheels being mounted to respective bogies each of which is operatively connected to a track frame member for pivotal movement relative thereto the track frame member being pivotally connected to a suspension arm one end of which is pivotally connected to the vehicle body and the other end mounted for spring biased movement relative to the vehicle body. It will be appreciated that this unique arrangement of the load sharing wheels could be used on vehicles other than that described above.

BRIEF DESCRIPTIONS OF THE DRAWINGS

The advantages of the various aspects of the invention will become apparent from the following description of preferred embodiments with reference to the accompanying drawings wherein.

DETAILED DESCRIPTION

The greatest problems associated with an elastomeric track-over-wheel propulsion system for heavy duty vehicles has been:

(1) Maintaining lateral positioning between each track and its entrained drive, idler and load carrying wheels when the track is subject to high lateral forces.

(2) Maintaining a positive drive between each track and drive wheel when accommodating continued debris and friction reducing material.

(3) Maintaining braking ability.

(4) The need for a highly tensioned track for friction engagement.

(5) Maintaining the idler wheel movement in parallel lateral plane.

(6) Having a front idler axle with no shock absorbing suspension.

(7) Having load sharing track rollers on suspension system without causing reciprocal bounce between the spring supports.

The preferred embodiments of the invention described hereinafter have been found to alleviate one or more of the aforementioned problems.

Figure 1:
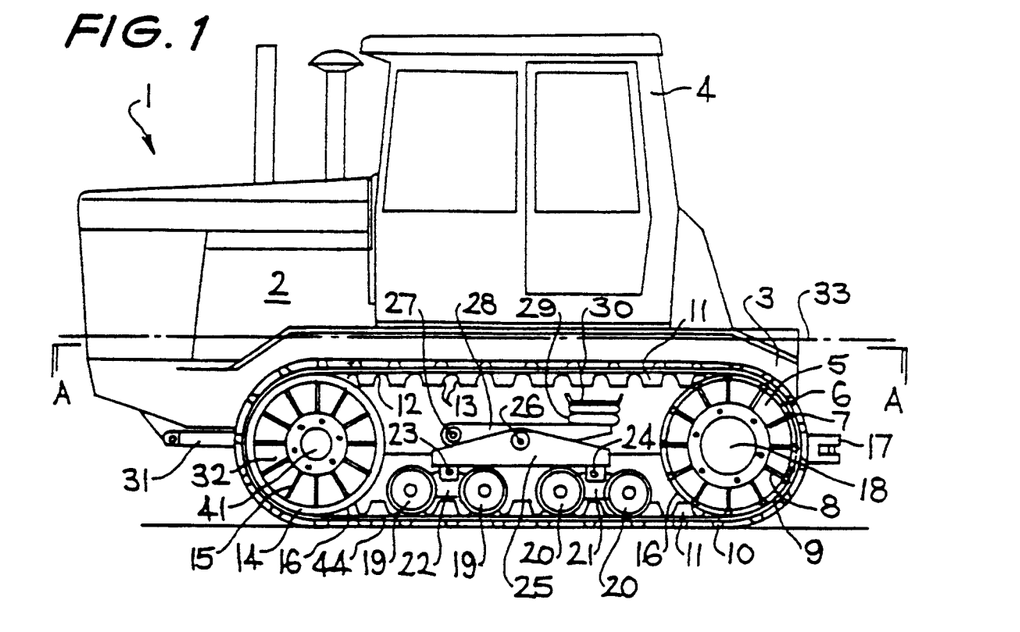
FIG. 1 is a side elevation view of the work vehicle.
Figure 2:
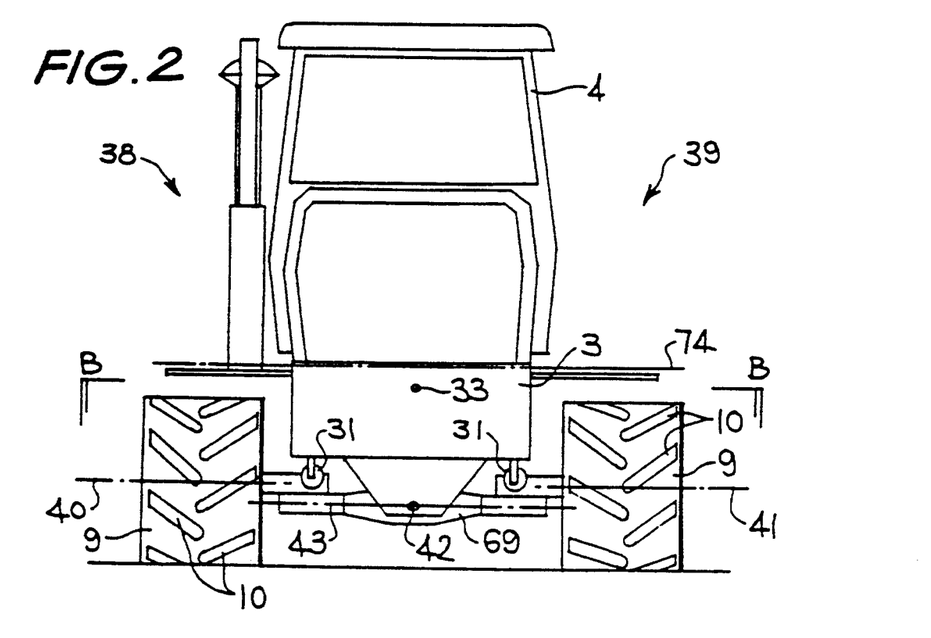
FIG. 2 is a front elevation view of the work vehicle as illustrated in FIG. 1.
Figure 3:
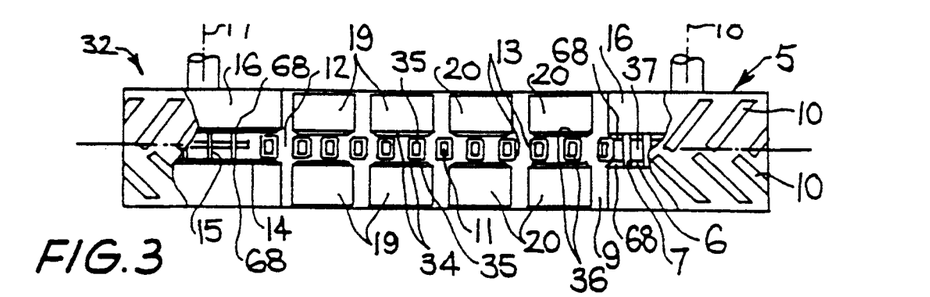
FIG. 3 is a plan view taken along line A—A of FIG. 1.

FIG. 1 illustrates the heavy duty elastomeric track laying vehicle 1 having a chassis and frame 3 with a longitudinal axis 33, an operators cabin 4 and an engine 2. Connected to frame 3 is a drawbar 17 which is used to attach draft loads. Although the vehicle illustrated would be used in the main for heavy-duty draft work, the principles inherent in this invention would also apply to a vehicle for pushing, hauling and carrying large loads. The vehicle is propelled by an elastomeric track 9 along each longitudinal side of chassis 3 in which is entrained a drive wheel 5, an idler wheel 32 and load sharing track wheels 19, 20. Ground engagement of the track 9 is made by lugs 10 being part of track 9. Each track is supported by laterally spaced surfaces 16 of the wheel 5 and idler wheel 32.

Each track 9 has direct drive engagement with the drive wheel 5 by means of an interlock between the cross members 7 of the drive wheel 5 and the drive lugs 11 which are part of the track 9. See FIG. 6.

Figure 6:
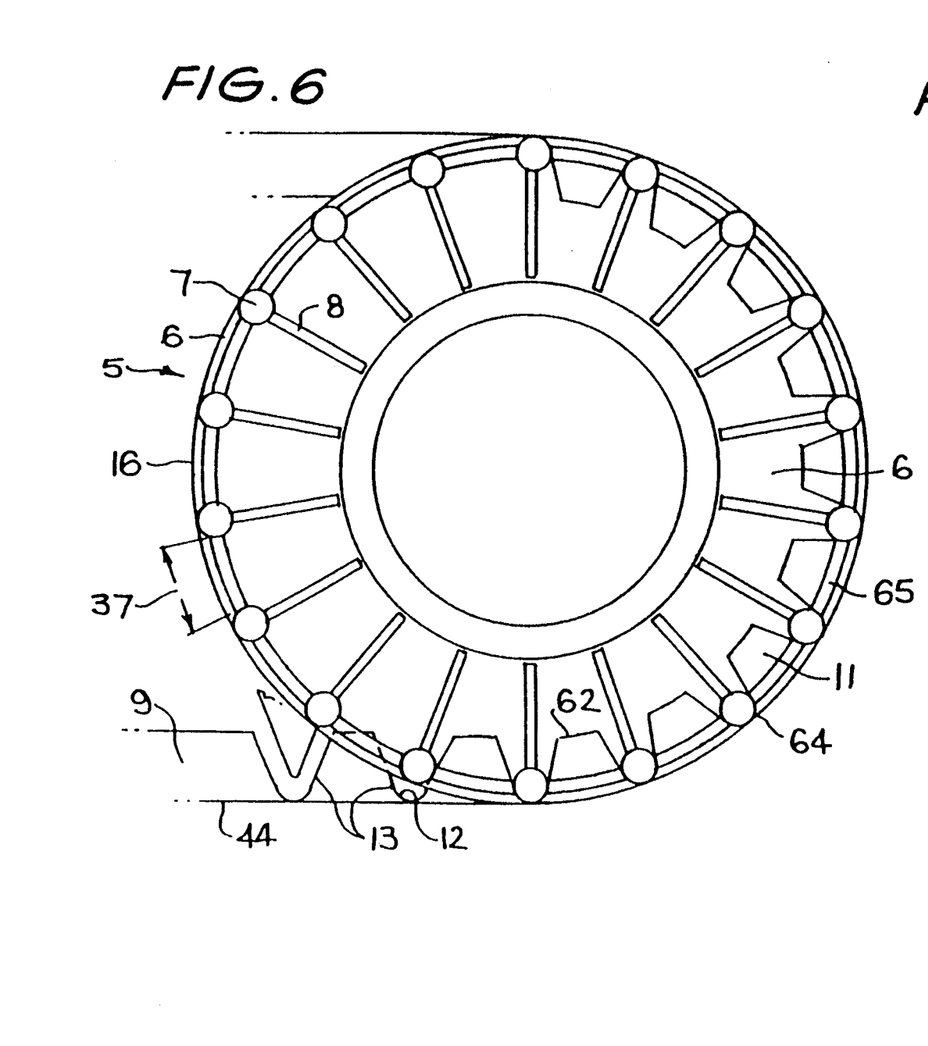
FIG. 6 is a side view of a drive wheel construction and track showing interlocking sections for positive drive.

The interlock between cross members 7 and drive lugs 11 is maintained by the hydraulic cylinder 31 tensioning the idler wheel 32 away from the drive wheel 5.

This drive system can be likened to a roller chain and sprocket drive but the roller forms part of the sprocket while the teeth form part of the chain. For a more detailed examination of the drive system, FIGS. 3, 4, 5, 6 & 7 should be examined in conjunction with the following.

Figure 7:
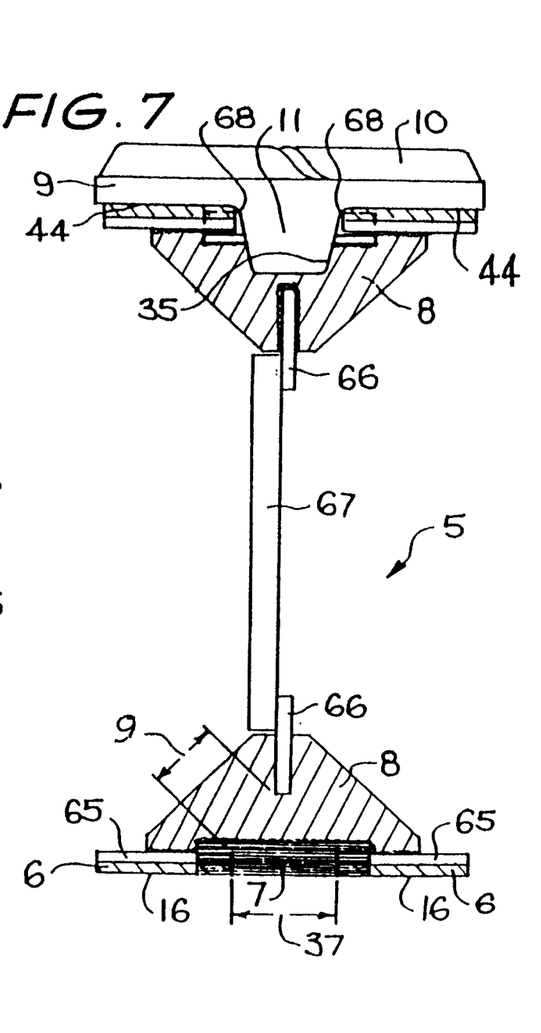
FIG. 7 is a cross-sectional view of the drive wheel and shows how lateral location is achieved between the drive wheel and track.

The drive wheel 5 of FIG. 7 rotates around axis 18 and is attached to the transmission drive flange 67 by means of a wheel knave 66 to which is attached lateral plates or spokes 8. These spokes 8 support two laterally spaced rims 65 to which may be bonded a firm elastomeric cushion 6. The elastomeric cushion 6 consists preferably of but not limited to a polyurethane elastomer with a hardness of approximately 85 to 90 duro. The surface 16 of the cushion 6 supports the surface 44 of the track 9. Between the two rims 65, round drive cross members 7 are attached laterally to form the driving means of drive wheel 5. The outer surface of the cross members 7 are flush with the outer surface 16 of the cushion 6. For the wheel 5 to accept the drive lugs 11 of track 9 there is an opening 37 bounded laterally by two cross members 7 and longitudinally by the two rims 65 and cushion 6 which form the guiding surface 68. The drive lugs 11 of the track 9 are guided into lateral registry with the drive wheel 5 by the cushion 6 and rims 65 having inwardly angled sides 68 that interface with the inwardly angled guiding surface 35 of lugs 11. Lateral registry is also assisted by the cross member 7 pulling in a "chain-like" action on drive lug 11 of track 9. The open area 37 is laterally wider than the inner lateral width 47 (FIG. 4) of drive lug 11. The angle 36 (FIG. 4) along the lateral facing side 35 of lug 11 should be approximately 100 degrees from surface 44 to allow a sliding movement with guiding surface 68 when high lateral forces are applied to track 9.

Figure 4:
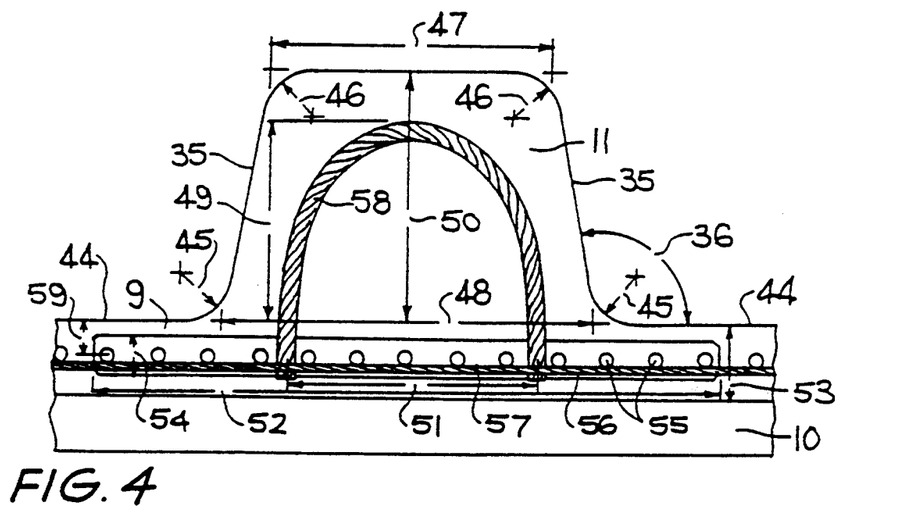
FIG. 4 is a cross sectional view of an elastomeric track construction in accordance with the invention.
Figure 5:
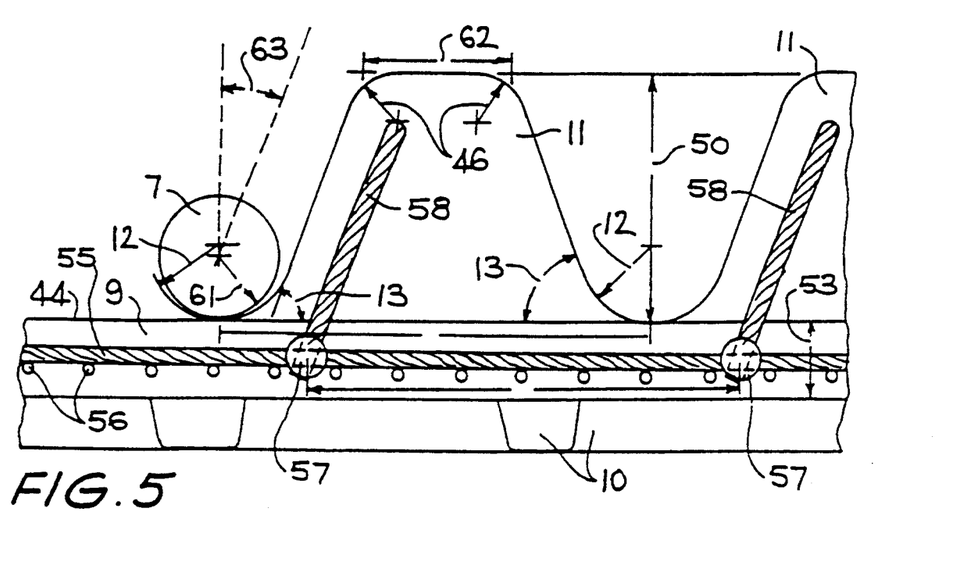
FIG. 5 is a side cross sectional view of an elastomeric track construction in accordance with the invention.

Drive lugs 11 of track 9 also have inwardly sloping angles 13 along the longitudinal facing sides to allow positioning of the cross drive member 7 before being fully engaged with the drive lug 11. The angle 13 is the same as the "entry" and "exit" angle 63 of cross drive member 7.

Figure 8:
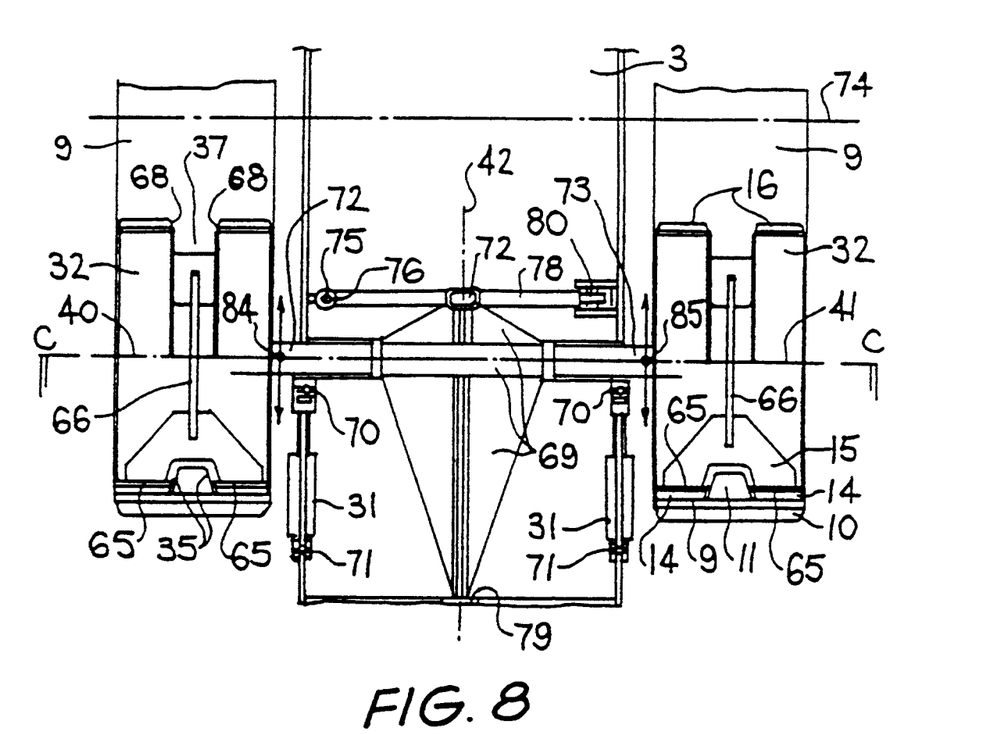
FIG. 8 is a cross-sectional view taken along line B—B of FIG. 2 depicting front idler construction, track tensioning and idler suspension.

The idler wheels 32 which rotate around axis 40, 41 are of similar construction to that of the drive wheel 5, but without cross member 7. Each idler wheel consists mainly of a knave 66 attached to an axle 72 or 73 (FIG. 8). Knave 66 is also attached to lateral plates or spokes 15 placed radially around the axis of rotation 40 and 41 of the idler axles 72 and 73. The spokes 15 are attached to laterally spaced rims 65 to which may be bonded an elastomeric cushion 14 which has a surface 16 to support surface 44 of track 9. The spokes 15 have been cut away to make an open area 37 which allows random entry of the drive lugs 11 to any point around the circumference of idler wheel 32.

The drive lugs 11 of track 9 are guided into lateral registry with the idler wheel 32 in the same way as the drive wheel 5 but without the assistance of the cross members 7.

The track 9 and drive lugs 11 maintain lateral registry with the load sharing wheels 19 and 20 because these wheels form a channel in a longitudinal line between the drive wheel 5 and idler wheel 32. As with the drive wheel 5 and idler wheel 32, lateral movement of the track 9 is restricted to lateral movement of the drive lugs 11 within the angled guiding surfaces 34 of each pair of load sharing wheels 19 and 20. See FIG. 3.

The elastomeric track 9 has no joint(s) and is therefore continuous and has an endless characteristic.

While the elastomeric track 9 can be manufactured from a range of elastomers, the preferred track 9 would be a fully molded track manufactured from polyurethane having a hardness of approximately 85 DURO. This material has the properties to allow "rolling-out" of flowable debris ingested between the track 9, surface 44 and the support surfaces 16 of the drive wheel 5, idler wheel 32 and load sharing wheels 19 and 20. Non-flowable material between these surfaces will do little or no damage because of the characteristics of polyurethane. Because the track 9 is directly driven by the drive wheel 5 there is no relative movement between the wheel 5 and track 9 to cause an abrasive action by non flowable material or debris.

Flowable debris ingested into the track drive area and idler wheel area is returned to the environment by a "squeezing" action of the tensioned track 9 surface 44 against the support surfaces 16 of the drive wheel 5, idler wheel 32 and load sharing wheels 19 and 20. Flowable debris when being "squeezed" or "rolled" will be returned to the environment either at each lateral side of the track 9 or through the open area 37 of either the drive wheel 5 or idler wheel 32. There is therefore a continued cleaning action of the track-drive system without loss of engagement between track 9 and drive wheel 5.

As mentioned previously the preferred elastomeric track 9 would be of continuous construction and fully molded from a polyurethane elastomer. The track 9 has longitudinal filaments 55 wound and molded within the track 9 in one length spaced approximately 20 mm apart and extending from one side of the track 9 to the other side of track 9, being disposed centrally 59 within the track 9 thickness 53 on the lateral plane. Lateral reinforcing filaments 56 are molded in the track 9 adjacent to the longitudinal filaments 55 and spaced approximately 25 mm apart and placed at 90 degrees to the longitudinal filaments 55. The lateral filaments 55 are the same length as the track 9 width. An optional track 9 may also include two broader ply reinforcing filaments adjacent to the longitudinal filaments 55. The first breaker ply would be molded so that the strands of ply are laid at 45 degrees and adjacent to filament 55 with the second, breaker ply strands laid 90 degrees adjacent to the first ply strands. The track 9 also incorporates the driving lugs 11 which are centrally located and evenly spaced along the longitudinal line of the track 9 and extend away from the supporting surface 44. Each lug 11 has sloped inwardly angled laterally facing surfaces 35 which are 100 degrees angle 36 from the surface 44 of track 9. The base of the drive lug 11 has a lateral width 48 of not less than 150 mm and has a radius 45 of not less than 20 mm. This radius 45 adds lateral strength to the drive lug 11. The height 50 of each drive lug is determined mostly by the diameter of the drive wheel 5 (See FIG. 6) so that each drive lug 11 is partially laterally located in the drive wheel 5 before the previous and adjacent lug is fully located. A height of the lug 11 of 100 mm for a drive wheel 5 diameter of 1000 mm is satisfactory. The top or innermost lateral width 47 of lug 11 is determined by the base width 48, the angle 36 and height 50 and having a radius 46 (See FIG. 4).

The longitudinal facing sides of the drive lugs 11 are sloped inwardly at an angle 13 which will accept entry and exit of the drive cross member 7 to the base of and between drive lugs 11. The area between and at the base of the drive lugs 11 has a radius 12 adjacent to surface 44 which is greater than the radius 61 of the cross member 7 when that section of track 9 forms a relatively straight line. As the track 9 and drive lugs 11 become entrained around the drive wheel 5 the radius 12 decreases to a closed radius 64 with the base of the opposing sides of each drive lug 11 fitting firmly around the cross member 7.

The radius 12 is dependent on radius 61 of the cross member 7 and the diameter of drive wheel 5.

The longitudinal spacing of the drive lugs 11 along track 9 must be identical to the spacing of the cross member 7 on the outer circumference of the drive wheel 5. The top or innermost longitudinal length 62 of lug 11 is determined by the spacing distance between each lug 11, the radius 12, height 50 and angle 13, and having radius 46. Each drive lug 11 is supported and reinforced to the track 9 by means of a reinforcing filament 58 which loops into the drive lug 11 from a round anchor filament 57 disposed laterally within track 9 and having centrally located holes through which pass the longitudinal filaments 55.

The longitudinal filaments 55 not only provides the track 9 with its longitudinal inextensible yet flexible character which is necessary to resist undesired stretching, but the filaments 55 act as a broad base in which is placed the anchor filament 57 so that each drive lug 11 is mechanically coupled to each other drive lug 11 and the whole of the track 9. Molded into and extending externally from track 9 are the grousers or ground engaging lugs 10. These ground engaging lugs 10 are arranged in a "V" pattern which is common for an agricultural tractor tire but other patterns for different vehicle applications could be used.

The track 9 tensioning mechanism and front axle suspension system allows each track 9 to be individually tensioned on a sub frame which has a suspension and oscillation mount on the chassis.

To explain further each idler wheel 32 is mounted to separate axles 72 and 73 which rotate around the axes 40 and 41. Each is connected to a bearing or sleeve 82 which allows rotation of the axles 72 and 73 on shafts 81 and 83 around the axis 43 of sub-frame 69. The sub frame 69 oscillates around the longitudinal axis 42 and is fixed to the frame 3 by means of a spherical bearing 79 and a second spherical bearing 77 which is connected to a lateral cross member 78 fixed to frame 3 by means of spherical bearing 80 and suspended by cylinder 76 which is attached to frame 3 by means of spherical bearing 75.

Figure 9:
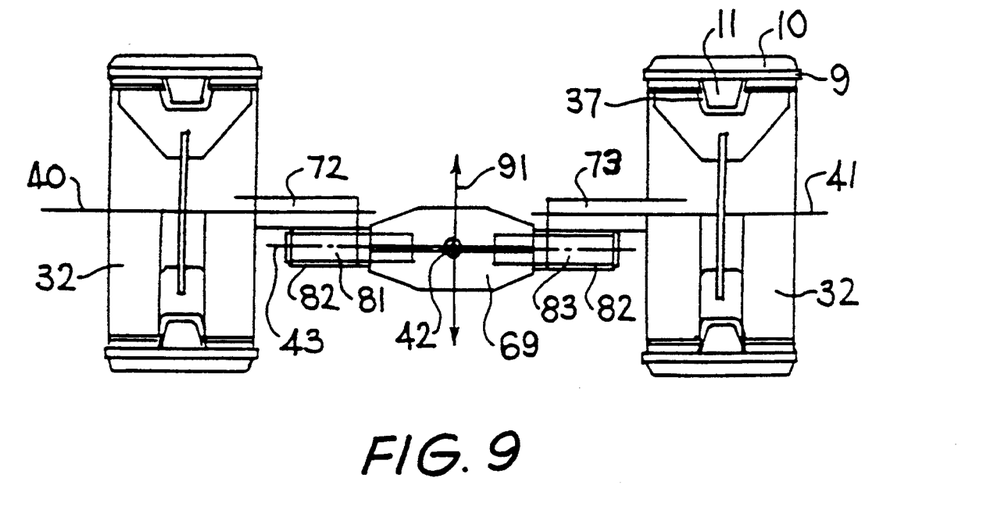
FIG. 9 is a view taken along line C—C of FIG. 8.

Each idler wheel 32 independently tensions their respective tracks 9 by means of hydraulic cylinders 31 which are fixed at one end to the respective axles 72 and 73 by means of spherical bearing 70 and the other end of cylinder 31 are fixed to the frame 3 by means of spherical bearings 71 (See FIGS. 8 & 9). By having the two idler wheels 32 on separate axles 72 and 73 which can rotate around axis 43 each axle 72 and 73 is able to move longitudinally 84 and 85 parallel to the longitudinal axis.

The hydraulic cylinders 31 when being supplied with a constant hydraulic pressure maintain a constant tension on axles 72 and 73 and idler wheels 32 through the full parallel longitudinal movement 84 and 85.

Figure 10A:
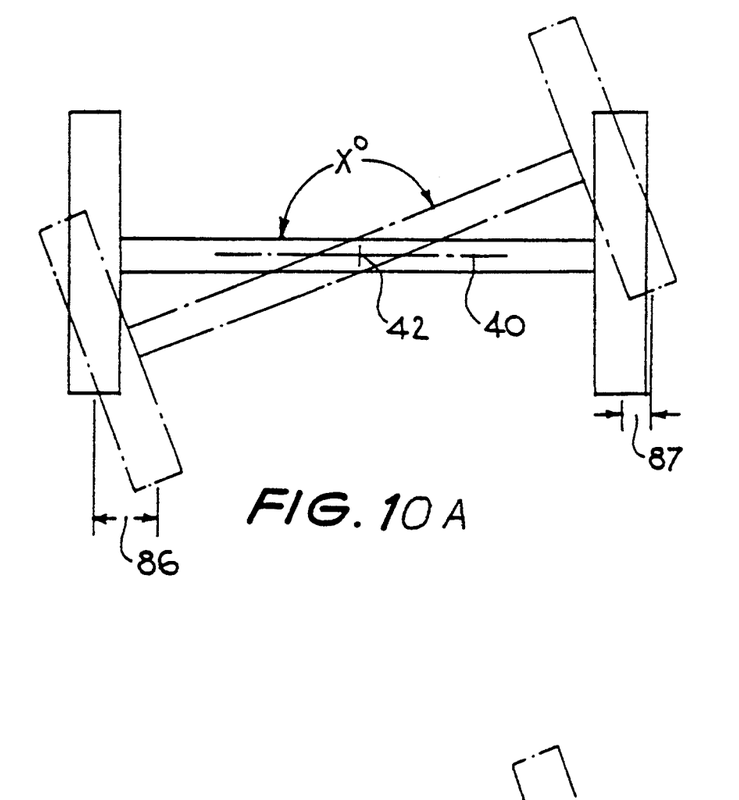
FIGS. 10A and 10B are diagrammatic representations of the relative lateral movement of the wheel center with two differing axle pivot location.
Figure 10B:
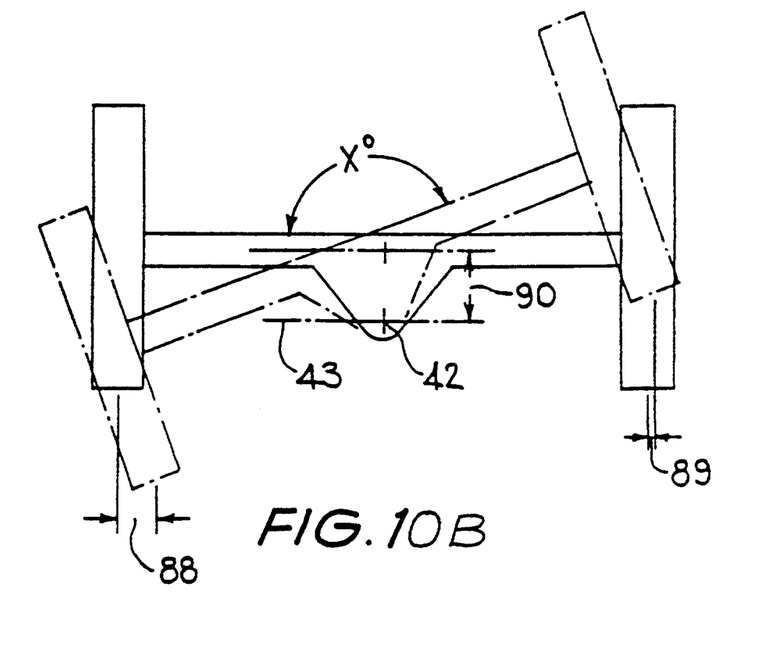
Figure 11:
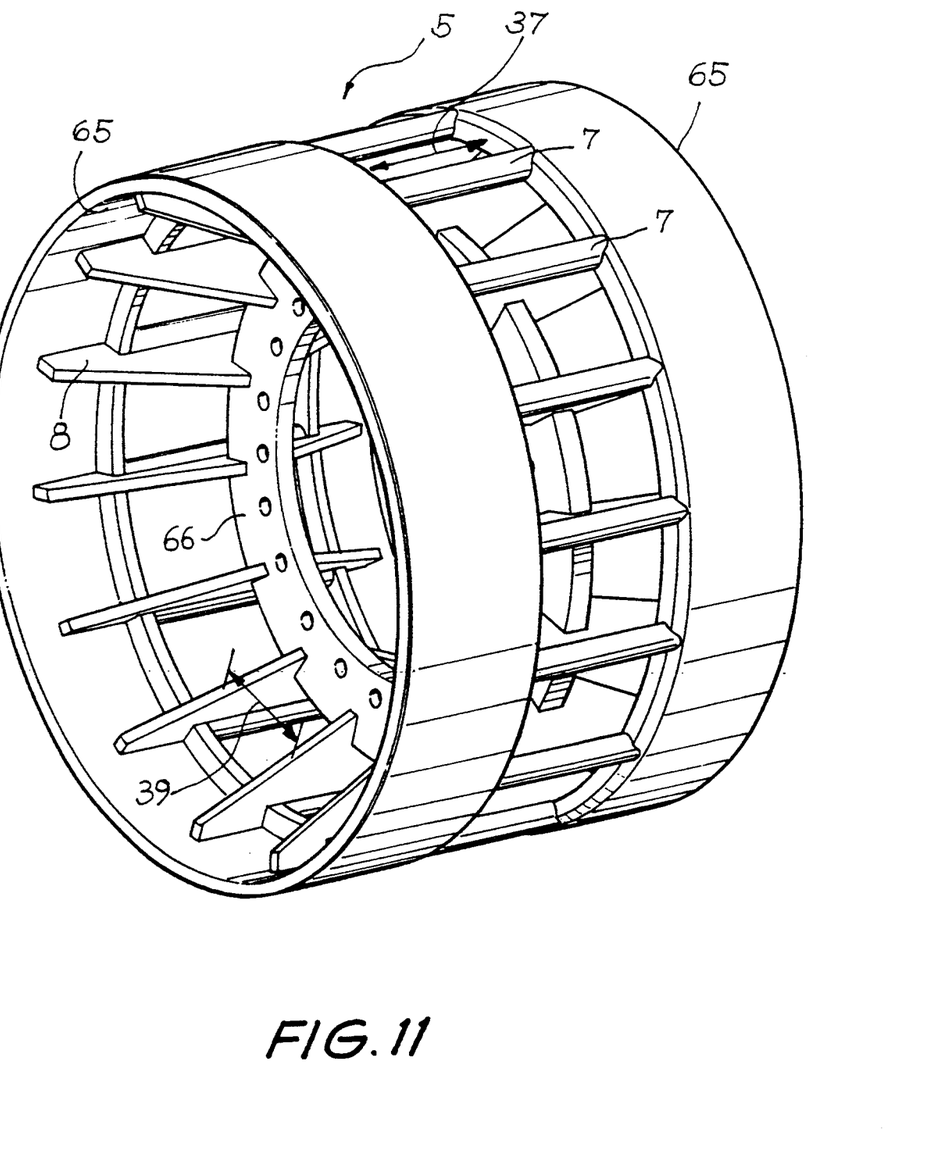
FIG. 11 is a perspective view of the drive wheel of the invention.

Oscillation of the sub frame 69 is around the longitudinal axis 42 which is vertically lower than lateral axis 40 and intersects with lateral axis 43. This positioning of axis 42 to distance 90 lower than lateral axis 40 reduces the lateral movement 88 and 89 to the center of the idler wheels 32. FIG. 10A and 10B are diagrammatic comparisons of relative lateral movement of the idler wheels with the same degree of oscillation but different positioning of the longitudinal axis 42. FIG. 10A depicts a greater lateral movement 86 and 87 than the lateral movement 88 and 89 of FIG. 10B. This reduction of lateral movement 88 and 89 is important in assisting the retention of lateral registry of the drive lugs 11 of track 9 in the guiding surfaces 68 of the idler wheels 32 and the guiding surfaces 34 of the load sharing wheels 19 and 20 when the sub frame 69 is oscillating.

Suspension of the sub frame 69 and axles 72 and 73 is by way of vertical movement 91 relative to the chris 3. This movement 91 is necessary to stop shock loads encountered by idler wheels 32 being transmitted to frame 3. A hydraulic cylinder 76 when connected to an accumulator applies a variable spring force to the cross arm 78 which is also attached to frame 3. Cross arm 78 restricts lateral movement of sub frame 69 relative to chassis 3.

The tracked work vehicle 1 has load sharing wheels 19 and 20 on either side of the vehicle which run on the weight support surface 44 of tracks 9. Each set of load sharing wheels 19 and 20 is mounted on minor track frame bogie 21 and 22 which are mounted to a rigid track frame 25 at pivot points 23 and 24. The rigid track frame 25 pivots around an axle 26 which is fixed to suspension arm 28. Arm 28 at one end pivots around an axle 27 affixed to frame 3 and at the other end is mounted an air spring which is also affixed to frame 3 (See FIG. 1). This assembly allows the independent vertical movement of the load sharing wheels 19 and 20 while equalizing the pressure on the load support surface 44 of track 9.

The rigid track frame 25 controls reciprocal "bounce" when the track 9 and surface 44 are placed on regular high-low ground surfaces such as corrugated road surfaces.

The invention in its various aspects and preferred embodiments can provide a more workable solution to the prior art problems by way of an elastomeric positively driven tracked work vehicle that is able to work in a greater range of conditions while maintaining the following advantages. A tracked vehicle that will:

(1) Maintain a positive drive even in wet conditions.
(2) Maintain a positive drive with continued ingestion of foreign material.
(3) Provide a high level of tractive effort.
(4) Provide a minimal ground compression.
(5) That is roadable without damage to the road surface.
(6) Not have excessive parasitic power loss due to a high level of track tension.
(7) Maintain relatively high speed without excessive noise levels and costly track wear.
(8) Provide a smooth ride for the operator.
(9) Operate in a heavy-duty work mode without breaking the tracks losing positive drive between the track and drive wheel or disengaging the tracks from the drive and idler wheels.
(10) Accommodate a high braking force without slippage between the track and the braking wheel.

Finally, it is to be understood that various alterations, modifications and/or additions may be incorporated into the various constructions and arrangements of parts without departing from the spirit and ambit of the invention.

I claim:

1. A drive assembly for a track laying vehicle having a vehicle body, a longitudinal axis extending between forward and rearward ends of the vehicle, and at least one track mounted for movement on the vehicle body, the drive assembly comprising:

at least first and second rotatable wheels relatively spaced in the direction of said longitudinal axis with at least one of said wheels being a drive wheel; and a continuous elastomeric track comprising a main body having a ground engaging surface, an opposite wheel engaging surface and a plurality of power transmission elements integrally molded with said main body and projecting from said wheel engaging surface;

said drive wheel comprising a hub member, a peripheral edge on said hub member, a plurality of circumferentially spaced rim supports connected to said hub member, each of said rim supports extending from said hub member and comprising at least one plate-like body having at least one laterally extending side portion, a radially outer support portion and a radially inner portion, at least one pair of circumferential rim sections operatively connected to said outer support portions of said rim supports in laterally spaced apart relation with respect to each other to form a gap therebetween, open side zones between said rim sections and said side portions of adjacent rim supports, and a plurality of circumferentially spaced drive members extending between said rim sections and separating said gap into a plurality of circumferentially spaced radially outer zones each being adapted to receive therein at least one of said power transmission elements on said continuous track so that said power transmission elements are engageable with said drive members with said radially outer zones communicating with said open side zones.

2. The drive assembly as claimed in claim 1, wherein said track further comprises:

at least one drive side on each power transmission element, a plurality of substantially parallel reinforcing filaments extending in said longitudinal direction of said main body, and a plurality of spaced apart laterally extending anchor members within said main body of said track in regions adjacent said power transmission elements and connected to said longitudinally extending reinforcing filaments.

3. The drive assembly as claimed in claim 2 and further comprising:

additional reinforcing filaments in said main body of said track operatively connected to said anchor members and extending into said power transmission elements.

4. The drive assembly as claimed in claim 3 wherein:

said additional reinforcing elements each comprises at least one loop of filament having free ends connected to respective anchor members and extending into a respective transmission element.

5. The drive assembly as claimed in claim 4 wherein:
said at least one loop of filament is adjacent to and extends substantially parallel to said at least one drive side.

6. The drive assembly as claimed in claim 4 wherein:
said at least one loop of filament having free ends comprises sides extending substantially parallel to said at least one drive side.

7. The drive assembly as claimed in claim 1 wherein:
said radially outer zones of said drive wheel are in communication with said open side zones on both sides of said drive wheel.

8. The drive assembly as claimed in claim 1 wherein:
said rim sections have edges facing each other and an outer face on each rim section; and
at least a portion of each of said facing edges is inclined inwardly from a respective outer face.

9. The drive assembly as claimed in claim 1 wherein:
said drive members comprise rods.

10. The drive assembly as claimed in claim 1 wherein:
said drive members comprise tubes.

11. The drive assembly as claimed in claim 1 wherein:
said drive members comprise bars.

12. The drive assembly as claimed in claim 1 wherein:
at least some of said drive members are secured to at least some of said rim supports.

13. The drive assembly as claimed in claim 12 wherein:
at least some of said drive members are connected to said rim sections.

14. The drive assembly as claimed in claim 1 wherein:
at least some of said drive members are connected to said rim sections.

15. The drive assembly as claimed in claim 1 wherein:
at least some of adjacent laterally extending side portions of said plate-like bodies of said rim supports taper inwardly towards each other between said outer support portions and inner portions thereof.

16. A track for a track laying vehicle having a vehicle body, a longitudinal axis extending between forward and rearward ends of the vehicle, and at least one track mounted for movement on the vehicle body, the track comprising:
a continuous elastomeric track comprising a main body having a ground engaging surface, an opposite wheel engaging surface and a plurality of power transmission elements integrally molded with said main body and projecting from said wheel engaging surface;
at least one drive side on each power transmission element;
a plurality of substantially parallel reinforcing filaments extending in the longitudinal direction of said main body;
a plurality of spaced apart laterally extending anchor members within said main body of said track in regions adjacent said power transmission elements and connected to said longitudinally extending reinforcing filaments; and
additionally reinforcing filaments operatively connected to said anchor members and extending into said power transmission elements.

17. The track as claimed in claim 16 wherein:
said additional reinforcing elements each comprises at least one loop of filament having free ends connected to respective anchor members and extending into a respective transmission element.

18. The track as claimed in claim 17 wherein:
said at least one loop of filament is adjacent to and extends substantially parallel to said at least one drive side.

19. The track as claimed in claim 17 wherein:
said at least one loop of filament having free ends comprises sides extending substantially parallel to said at least one drive side.

20. A drive wheel for a track laying vehicle having a vehicle body, a longitudinal axis extending between forward and rearward ends of the vehicle, and at least one track mounted for movement on the vehicle body, the drive wheel comprising:
a hub member, a peripheral edge on said hub member, a plurality of circumferentially spaced rim supports connected to said hub member, each of said rim supports extending from said hub member and comprising at least one plate-like body having at least one laterally extending side portion, a radially outer support portion and a radially inner portion, at least one pair of circumferential rim sections operatively connected to said outer support portions of said rim supports in laterally spaced apart relation with respect to each other to form a gap therebetween, open side zones between said rim sections and said side portions of adjacent rim supports, and a plurality of circumferentially spaced drive members extending between said rim sections and separating said gap into a plurality of circumferentially spaced radially outer zones each being adapted to receive therein at least one of said power transmission elements on said continuous track so that said power transmission elements are engageable with said drive members with said radially outer zones communicating with said open side zones.

21. The drive assembly as claimed in claim 20 wherein:
said radially outer zones of said drive wheel are in communication with said open side zones on both sides of said drive wheel.

22. The drive assembly as claimed in claim 20 wherein:
said rim sections have edges facing each other and an outer face on each rim section; and
at least a portion of each of said facing edges is inclined inwardly from a respective outer face.

23. The drive assembly as claimed in claim 20 wherein:
said drive members comprise rods.

24. The drive assembly as claimed in claim 20 wherein:
said drive members comprise tubes.

25. The drive assembly as claimed in claim 20 wherein:
said drive members comprise bars.

26. The drive assembly as claimed in claim 20 wherein:
at least some of said drive members are secured to at least some of said rim supports.

27. The drive assembly as claimed in claim 26 wherein:
at least some of said drive members are connected to said rim sections.

28. The drive assembly as claimed in claim 20 wherein:

at least some of said drive members are connected to said rim sections.

29. The drive assembly as claimed in claim 20 wherein:

at least some adjacent laterally extending side portions of said plate-like bodies of said rim supports taper inwardly towards each other between said outer support portions and inner portions thereof.

* * * * *